A. A. THOMPSON.
VELOCIPEDE.
APPLICATION FILED JULY 9, 1918.
1,308,309.
Patented July 1, 1919.
2 SHEETS—SHEET 1.
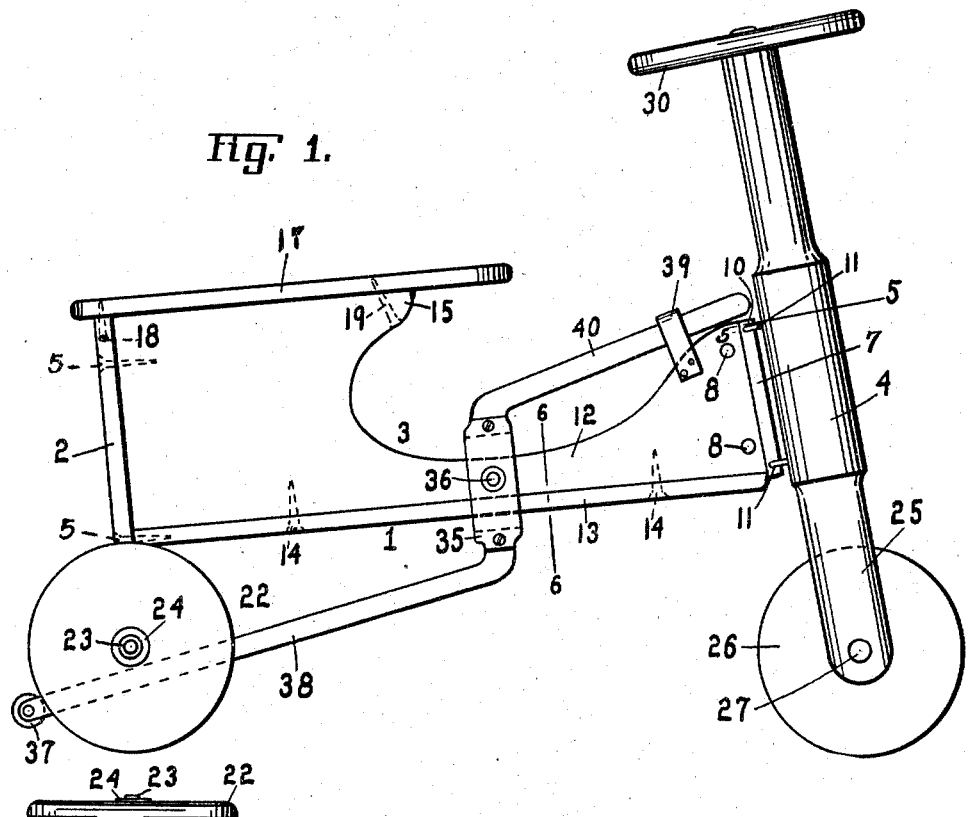
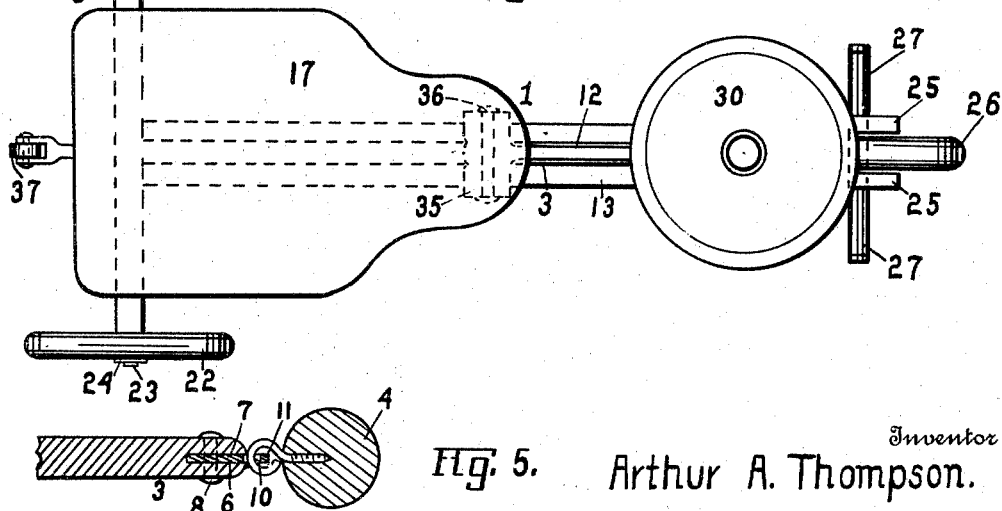
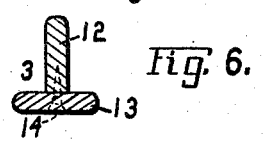
Inventor
Arthur A. Thompson.

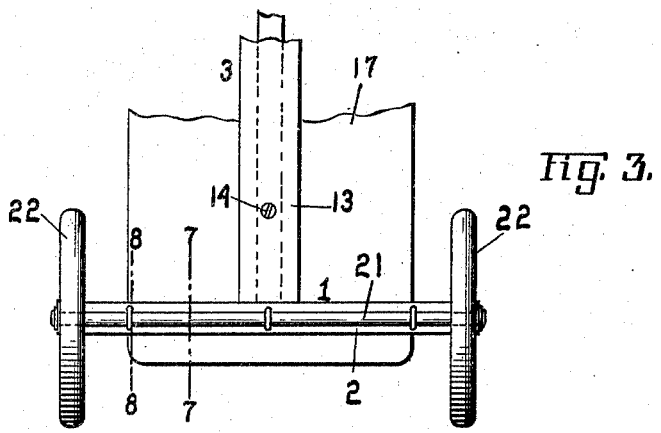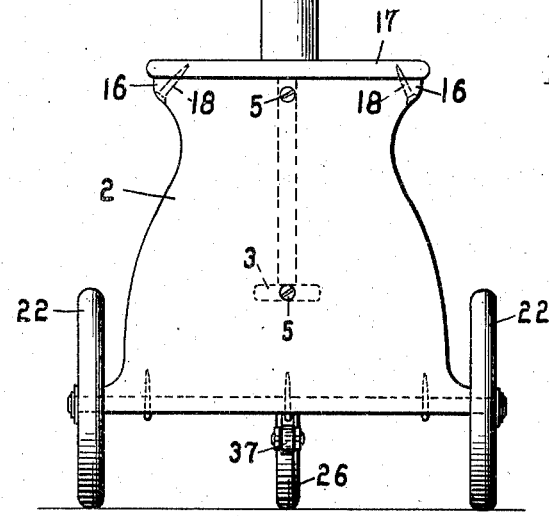

UNITED STATES PATENT OFFICE.

ARTHUR A. THOMPSON, OF OAKLAND, CALIFORNIA.

VELOCIPEDE.

1,308,309.　　　　　Specification of Letters Patent.　　Patented July 1, 1919.

Application filed July 9, 1918. Serial No. 244,074.

*To all whom it may concern:*

Be it known that I, ARTHUR A. THOMPSON, citizen of the United States, residing at Oakland, in the county of Alameda and State of California, have invented certain new and useful Improvements in Velocipedes, of which the following is a specification.

The invention is a velocipede particularly adapted to be used by children.

The invention is illustrated in the accompanying drawing which forms a part of this specification and the appended claims.

Referring to the drawing:

Figure 1 is a side elevation of the velocipede.

Fig. 2 is a plan view thereof.

Fig. 3 is a bottom plan of the rear portion of the velocipede.

Fig. 4 is a rear view of the velocipede.

Fig. 5 is a sectional view taken on line 5—5 of Fig. 1.

Fig. 6 is a section taken on line 6—6 of Fig. 1.

Fig. 7 is a cross section taken on line 7—7 of Fig. 3.

Fig. 8 is a section on line 8—8 of Fig. 3.

In the drawings, 1 indicates a velocipede frame including a rear transverse upright 2, a longitudinal beam 3 and a front standard and steering post 4. The beam 3 is secured at its rear end to the upright 2, midway between the ends of said upright by screws 5. A slit 6 is cut longitudinally in the front end of the beams 3 in which fits a metal plate 7 which is secured in the beam by rivets 8 extending transversely through the forward end of the beam and through the plate. The forward edge of the plate 7 extends beyond the front end of the beam 3 and is provided with holes 9 and 10 near its lower and upper edges through which extend the eye heads of eye screws 11, which are screwed into the rear of the standard steering post 4, thus permitting turning of the steering post from right to left of the beam 3. The beam 3 is T-shaped in cross section and includes an upright member 12 and a horizontal member 13 which is secured to the lower face of the member 12 by screws 14. The member 12 is shaped to present an artistic appearance and is undercut to provide a lip 15 for the purpose to be described. The upright 2 is shaped to present an artistic appearance and is undercut to provide lips 16 for the purpose to be described. A seat 17 rests upon the top of the upright 2 and the member 12 of beam 3 and is secured thereto on its under side by screws 18 and 19 extending upwardly through lips 16 and 15 respectively into the seat. The lower edge of the upright 2 is formed with a groove 20 in which fits rear axle 21, the ends of which extend beyond the sides of the upright. Rear wheels 22 are journaled on the ends of the rear axle 21 and the ends of said axle are formed with heads 23 to prevent the wheels coming off the ends of the axle. Washers 24 are interposed on the ends of the axle between the wheels and the heads 23. The lower portion of the standard steering post 4 is formed with a fork 25 to receive the front wheel 26 which is journaled on axle 27 secured in the lower end of the fork with its ends extending beyond the fork at both sides to form a foot rest for the feet of the rider while coasting. A steering wheel 30 is secured on the upper end of the steering post 4 whereby the post and front wheel are turned to steer the velocipede.

A brake and anti-tipping device is provided for the velocipede which comprises a lever 35, pivoted to the beam 3 at 36, a roller 37, mounted on the rear end of the rear arm 38 of said lever which extends under and to the rear of rear axle 21, and a spring latch 39 mounted on the front end of beam 3 for engaging the front arm 40 of the lever to hold the lever in position with the roller 37 above the ground. By pulling upwardly on arm 40 the roller 37 is swung down into engagement with the ground and serves as a brake and prevents tipping of the velocipede backwardly.

Having described my invention, I claim as new and desire to secure by Letters Patent:

1. A velocipede including a frame, said frame including a beam and a steering post, rear wheels journaled on the rear of said frame, a front wheel journaled on said steering post, a metal plate secured in the front end of said beam and provided with holes at its forward end, eye screws in said post with its eye members extending through the holes in said plate, and a seat on said frame.

2. A velocipede including a frame, said frame including a beam and a steering post turnably mounted on said beam, rear wheels journaled on the rear of said frame, said beam being T-shaped in cross section and including an upright member and a horizontal member secured to the lower edge of said upright member, a front wheel journaled in said steering post, and a seat on said frame.

3. A velocipede including a frame, rear wheels mounted on said frame, a front steering wheel mounted on said frame, a lever pivoted on said frame, said lever extending rearwardly under the axle of the rear wheels and forwardly of the velocipede seat and means for holding the lever in position with the rear end thereof off the ground.

In testimony whereof I affix my signature.

ARTHUR A. THOMPSON.

Copies of this patent may be obtained for five cents each, by addressing the "Commissioner of Patents, Washington, D. C."